United States Patent
Seiler

(10) Patent No.: US 9,567,887 B2
(45) Date of Patent: Feb. 14, 2017

(54) EXHAUST GAS AFTERTREATMENT COMPONENT WITH AN HC ADSORBER FUNCTION AND EXHAUST GAS SYSTEM INCLUDING SUCH AN EXHAUST GAS AFTERTREATMENT COMPONENT

(71) Applicant: VOLKSWAGEN AKTIENGESELLSCHAFT, Wolfsburg (DE)

(72) Inventor: Valeri Seiler, Wahrenholz (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 130 days.

(21) Appl. No.: 14/479,348

(22) Filed: Sep. 7, 2014

(65) Prior Publication Data

US 2014/0373515 A1 Dec. 25, 2014

Related U.S. Application Data

(63) Continuation of application No. PCT/EP2013/052546, filed on Feb. 8, 2013.

(30) Foreign Application Priority Data

Mar. 10, 2012 (DE) .......................... 10 2012 004 924

(51) Int. Cl.
*F01N 3/08* (2006.01)
*F01N 3/28* (2006.01)
(Continued)

(52) U.S. Cl.
CPC ............ *F01N 3/0835* (2013.01); *B01D 53/04* (2013.01); *F01N 3/0814* (2013.01); *F01N 3/101* (2013.01);
(Continued)

(58) Field of Classification Search
CPC ...... Y02T 10/144; F02B 37/007; F02B 37/18; F02B 37/013; F02B 37/004; F02B 37/097; F01N 13/0097; F01N 13/017; F01N 3/035; F01N 3/0835; F01N 3/0878; F01N 3/101; F01N 3/2053
(Continued)

(56) References Cited

U.S. PATENT DOCUMENTS 5,538,697 A * 7/1996 Abe ..................... B01D 53/945
422/169
5,771,684 A * 6/1998 Hertl ..................... F01N 3/0814
137/833
(Continued)

FOREIGN PATENT DOCUMENTS

DE 19938038 A1 5/2000
DE 10201042 A1 * 8/2003 ............. F01N 3/281
(Continued)

OTHER PUBLICATIONS

Search Report issued by the German Patent and Trademark Office for German Patent Application No. DE 10 2012 004 924.2, dated Oct. 18, 2012.
(Continued)

*Primary Examiner* — Patrick Maines
(74) *Attorney, Agent, or Firm* — Manfred Beck, P.A.

(57) ABSTRACT

An exhaust gas aftertreatment component includes a ceramic carrier body with a plurality of axial flow channels, wherein the carrier body has an inner region and an outer region, which radially surrounds the inner region. A cell density of the carrier body is smaller in the inner region than a cell density in the outer region. At least the outer region of the carrier body has a coating, wherein the coating of the outer region has an HC adsorber function for a reversible adsorption of unburnt hydrocarbons. An exhaust gas system, which is equipped with such an exhaust gas aftertreatment com-
(Continued)

ponent, and a vehicle, which has such an exhaust gas system are also provided.

13 Claims, 2 Drawing Sheets

(51) Int. Cl.
  *F01N 13/00* (2010.01)
  *B01D 53/04* (2006.01)
  *F01N 3/10* (2006.01)
  *F01N 13/16* (2010.01)

(52) U.S. Cl.
  CPC ............. *F01N 3/105* (2013.01); *F01N 3/2828* (2013.01); *F01N 13/017* (2014.06); *F01N 13/16* (2013.01); *B01D 2257/702* (2013.01); *F01N 3/0821* (2013.01); *F01N 2240/20* (2013.01); *F01N 2240/36* (2013.01); *F01N 2250/14* (2013.01); *F01N 2330/321* (2013.01); *F01N 2330/48* (2013.01); *F01N 2410/12* (2013.01); *Y02T 10/20* (2013.01); *Y02T 10/22* (2013.01)

(58) Field of Classification Search
  USPC ................. 60/274, 284, 286, 287, 288, 289, 297,60/300
  See application file for complete search history.

(56) References Cited

U.S. PATENT DOCUMENTS

| | | | | |
|---|---|---|---|---|
| 5,787,707 | A * | 8/1998 | Hertl | F01N 3/0835 422/169 |
| 5,934,069 | A * | 8/1999 | Hertl | F01N 3/0835 60/274 |
| 6,354,076 | B1 * | 3/2002 | Yasui | F01N 3/0835 60/274 |
| 2002/0132726 | A1 * | 9/2002 | Endo | B01D 53/02 502/67 |
| 2005/0214503 | A1 * | 9/2005 | Sakamoto | B01D 39/2068 428/116 |
| 2010/0077738 | A1 | 4/2010 | Cavataio et al. | |
| 2010/0263358 | A1 * | 10/2010 | Chen | F01N 3/2828 60/299 |
| 2013/0269326 | A1 * | 10/2013 | Degen | F01N 3/0835 60/297 |
| 2015/0017073 | A1 * | 1/2015 | Tolle | F01N 3/0878 422/169 |

FOREIGN PATENT DOCUMENTS

| | | |
|---|---|---|
| DE | 102005032954 A1 | 1/2007 |
| DE | 102009029700 A1 | 4/2010 |
| EP | 0661098 A2 | 7/1995 |
| EP | 0697505 A1 | 2/1996 |
| GB | 2342055 A | 4/2000 |
| JP | 55147154 A * | 11/1980 |
| WO | 9518292 A1 | 7/1995 |

OTHER PUBLICATIONS

International Search Report for International Application No. PCT/EP2013/052546, dated Jun. 21, 2013.
Written Opinion of the International Searching Authority for International Application No. PCT/EP2013/052546 and translation thereof, available on Sep. 10, 2014.

* cited by examiner

EXHAUST GAS AFTERTREATMENT COMPONENT WITH AN HC ADSORBER FUNCTION AND EXHAUST GAS SYSTEM INCLUDING SUCH AN EXHAUST GAS AFTERTREATMENT COMPONENT

CROSS-REFERENCE TO RELATED APPLICATIONS

This application is a continuation, under 35 U.S.C. §120, of copending International Application No. PCT1EP20131052546, filed Feb. 8, 2013, which designated the United States; this application also claims the priority, under 35 U.S.C. §119, of German Patent Application No. DE 10 2012 004 924.2, filed Mar. 10, 2012; the prior applications are herewith incorporated by reference in their entirety.

BACKGROUND OF THE INVENTION

Field of the Invention

The invention relates to an exhaust gas aftertreatment component with an HC adsorber function. The invention further relates to an exhaust gas system having such an exhaust gas purification system and to a vehicle which has such an exhaust gas system.

The use of catalytic converters in the exhaust gas systems of internal combustion engines is nowadays common practice. For example, in particular in the case of diesel engines, oxidation catalytic converters are used, which convert unburnt hydrocarbons (HC) as well as carbon monoxide (CO), and, in the case of diesel engines and Otto cycle engines, reduction catalytic converters are used, which convert nitrogen oxides ($NO_x$). Furthermore, three-way catalytic converters are known that combine the function of oxidation catalytic converters and reduction catalytic converters, and thus catalytically convert all three components and are mainly used in Otto cycle engine. In principle, all catalytic converters require a specific minimum temperature in order to provide a sufficient conversion performance. As a criterion for this, the so-called light-off temperature or start-up temperature is used, at which the catalytic converter converts 50% of the limited exhaust gas components. After a cold start of the engine, this temperature has usually not yet been reached, so that, unless further measures are taken, the emissions, which are referred to as start emissions, leave the exhaust gas system unconverted.

The desire for a further reduction of emissions as well as the progressive lowering of exhaust gas limit values also require the reduction of the start emissions and thus require that the operating temperatures of the catalytic converter system are reached sooner. Current and even more so future exhaust gas emission control legislation therefore requires that also the start emissions are measured for determining the total emissions of a vehicle in standardized driving cycles.

A common measure for reducing the start emissions is to dispose relatively small volume precatalytic converters, which are also referred to as primary catalytic converters, close to the engine, Due to their small volume and their placement close to the engine, precatalytic converters reach their light-off temperature relatively quickly and then take over the conversion of a large part of the emissions until a main catalytic converter, which is provided downstream, also reaches its operating temperature.

From German Patent Application No. DE 102 01 042 A1 an exhaust gas catalytic converter having a monolithic ceramic carrier body is known, which has an inner region and an outer region, wherein the inner region has a higher cell density than the outer region. The flow channels of the inner and outer regions that pass axially through the carrier body have a catalytic coating (washcoat). Due to the higher cell density of the inner region, this region has a higher catalytic converter activity than the outer region. A swirl generator is disposed upstream of the catalytic converter carrier, wherein the swirl generator, at low flow velocities of the exhaust gas, that is, in case of low engine load ranges, directs the exhaust gas flow essentially into the inner region and, at higher flow velocities, that is in case of higher loads, into the outer region. This arrangement achieves that, after a cold start, initially the exhaust gas flow in the inner region is catalytically treated, wherein, due to the exothermic heat release, the inner region is heated relatively quickly and thus also hears the surrounding outer region.

U.S. Patent Application Publication No. 2002/0132726 A1 describes an exhaust gas system which includes a main catalytic converter and, downstream therefrom, Iwo parallel exhaust gas lines which can be selectively closed or, respectively, opened through the use of a switchover valve. The two parallel exhaust gas lines have a concentric configuration with an inner main line surrounded concentrically by a side line in which a ring-shaped HC adsorber is disposed. A return line branches off from the side line upstream from the HG adsorber, wherein the return line which feeds hydrocarbons, which are unburnt and desorbed from the adsorber, to the internal combustion engine. After a cold start the inner main line is closed and the exhaust gas flow is guided over the HG adsorber, which adsorbs and/or chemisorbs the unburnt hydrocarbons HG and hydrocarbons not converted by the not yet operational main catalytic converter. Once the main catalytic converter has reached its operating temperature, and thus ensures a sufficient HC conversion, the exhaust gas flow is directed into the main line. Due to the heating now taking place, the hydrocarbons desorb from the HG adsorber and are delivered to the engine combustion via the return line.

Furthermore, a similar concept is known that also uses the concentric structure of an HC adsorber provided outside and a main line provided inside, wherein in this concept the main catalytic converter is however not connected upstream but downstream from the HC adsorber. In this configuration, the return line described in U.S. Patent Application Publication No, 2002/0132726 A1 is omitted. Instead, the desorbed hydrocarbons are converted by the main catalytic converter connected downstream.

For the HC adsorber concepts discussed above, it would be desirable to equip them with an additional particulate filter function. Filter functions can however only be achieved through the use of ceramic carrier bodies (monoliths). However, if such monoliths are provided with a central bore, in order to realize the bypass function which bypasses the HC adsorber, the mechanical stability of the carrier body and thus its service life decreases. For this reason and also because of the difficulty of producing ring-shaped ceramic carrier bodies, metal carrier bodies are used in the conventional concepts. Just like ceramic monoliths, metal carrier bodies too have a plurality of longitudinally extending flow channels, which are, however, produced by the combination of a corrugated sheet metal and a flat sheet metal, which are wound in the form of a spiral. A particulate filter function, which is based on partly closed flow channels, is not possible with metal carrier bodies.

SUMMARY OF THE INVENTION

It is accordingly an object of the invention to provide an exhaust gas aftertreatment component which overcomes the above-mentioned disadvantages of the heretofore-known systems of this general type, It is in particular an object of the invention to provide an HC adsorber that is ring-shaped and thus has a central bypass function, while using a ceramic carrier body, without having to accept an impairment of its stability.

This object is achieved by an exhaust gas aftertreatment component according to the invention, an exhaust gas system which includes such an exhaust gas aftertreatment component, as well as a corresponding vehicle including such an exhaust gas system.

With the foregoing and other objects in view there is provided, in accordance with the invention, an exhaust gas aftertreatment component including:

a ceramic carrier body with a plurality of axial flow channels, the carrier body having an inner region and an outer region, the outer region radially surrounding the inner region;

the carrier body having a cell density in the inner region and having a cell density in the outer region, the cell density in the inner region of the carrier body being smaller than the cell density in the outer region of the carrier body; and at least the outer region of the carrier body having a coating, the coating of the outer region having an HC adsorber function for a reversible adsorption of unburnt hydrocarbons.

In other words according to the invention, there is provided an exhaust gas aftertreatment component including a ceramic carrier body with a plurality of axial flow channels, wherein the carrier body has an inner region and an outer region, which radially surrounds the inner region, wherein a cell density of the carrier body is smaller in the inner region than a cell density in the outer region and at least the outer region of the carrier body has a coating and the coating of the outer region has an HC adsorber function for a reversible adsorption of unburnt hydrocarbons.

The exhaust gas aftertreatment component according to the invention includes a ceramic carrier body (monolith) with a plurality of axial (i.e. extending along the exhaust gas flow direction) flow channels. The carrier body has in this case an inner region and an outer region surrounding the inner region, wherein a cell density of the carrier body in the inner region is smaller than a cell density in the outer region. At least the outer region of the carrier body, that is its flow channels, have a coating, wherein the coating of the outer region has an HC adsorber function for a reversible adsorption of unburnt hydrocarbons.

The term "cell density" or also "cell number" is generally, and also in the present description, understood as the number of the flow channels in relation to the cross section or the end faces of the carrier body. The standard international unit for the cell density is cpsi (cells per square inch). Furthermore, the term "an outer region surrounding the inner region" means that the outer region surrounds the inner region along its radial peripheral area, independent of any geometric cross-sectional configuration.

A mechanical support function of the carrier body as a whole is achieved by flow channels that exist in the inner region. The problem of reduced stability known in the prior art, as a result of a central bypass borehole in the carrier body is thus avoided. At the same time, the reduced cell density in the inner region relative to the outer region results in a low exhaust gas back pressure in the inner region, which is advantageous for the adsorber function in the outer region. Finally, the presence of flow channels or, respectively, cell was in the inner region makes it possible to provide them with a functionality if required, for example with a catalytic function.

According to another feature of the invention, the carrier body is a one-piece carrier body. In other words, the ceramic carrier body is preferably formed in one piece. In this case, the terms "in one piece" or "one-piece" are understood as a body that is made from a continuous material type, either in a manner of production that adds material or from a workpiece by removing material. The one-piece carrier body is therefore not composed of several partial bodies or sub-bodies. The manufacturing of monolithic carrier bodies with different cell density regions is technically possible (see German Patent Application No. DE 102 010 42 A1). Embodying the carrier body in one piece results not only in a simplification of its manufacture, but also in an increased stability, since stresses between otherwise assembled partial bodies are avoided.

According to an advantageous embodiment, the outer region has a particulate filter function in addition to its HC adsorber function. This is preferably achieved by alternately closed flow channels, whereby the exhaust gas is forced to laterally penetrate the channel walls surrounding the flow channels. When penetrating the porous filter wall, the soot particles contained in the exhaust gas are retained. The filter principle that is based on alternately closed flow channels is also referred to as a wall-flow filter or closed system. In contrast, the filter effect of so-called partial flow filters is based on the passage of exhaust gas through fiber mats or the like, which are not disposed in the flow channels themselves, but in the neighboring channels. Although it is also possible in the context of the present invention to configure the particulate filter function of the HO adsorber as a partial flow filter (bypass filter), it is however less preferred when compared to the function of the wall-flow filter.

According to an embodiment of the invention, the inner region of the ceramic carrier body has no coating (washcoat), and has therefore no catalytic or other function. In this embodiment, the function of the inner region is limited to the bypass function and the stabilization of the substrate.

According to another feature of the invention, the inner region has a coating with a catalytic function, in particular a three-way catalytic function. Thus, in an alternative embodiment of the invention, the inner region has a coating, in particular in the form of a washcoat, which is provided with a catalytic function. Preferably, this is a three-way catalytic function, which supports a catalytic conversion of both hydrocarbons (HG), carbon monoxide (CO) and nitrogen oxides ($NO_x$). For this purpose, the catalytic coating can contain the noble metals platinum, palladium and/or rhodium, in particular a combination of platinum and rhodium, or palladium and rhodium. The presence of a catalytic function in the inner region of the exhaust gas aftertreatment component makes it possible to correspondingly reduce the catalytic converter volume of a main catalytic converter, which is possibly present, and/or of a precatalytic converter, which is connected upstream. In this way an improved utilization of the installation space is obtained.

According to another feature of the invention, a ratio of the cell density in the outer region to the cell density in the inner region is an integer selected from the group including 2, 4, 6, 8, 9, and 12, in particular from the group including 2, 4, and 6. According to a preferred feature of the invention, a ratio of the cell density in the outer region to the cell density in the inner region is four. In other words, preferably the cell density of the outer region corresponds to an integer multiple of the inner region, since such a carrier body can be easily implemented, as far as the manufacturing technique is concerned, by the combining of cells and thus by slight modification of the tools used in the manufacturing process of the monolith. Advantageously, a ratio of the cell density of the outer region to the cell density of the inner region can thus be 2, 4, 6, 8, 9 or 12, in particular 2, 4 or 6. The lower limit is in this case limited by the increase of the exhaust gas backpressure associated with an increased cell density of the inner region. The upper limit of the ratio of the cell densities of the outer and inner region is limited by the decreased stabilization function of the inner region resulting from a reduced cell density. A particularly preferred compromise between exhaust gas backpressure and stabilization effect is a ratio of the cell density of outer region to inner region of about 4:1.

According to another feature of the invention, the cell density in the inner region is in a range from 100 to 225 cells per square inch, in particular in a range from 150 to 200 cells per square inch. Thus, in terms of a sufficient stabilization on the one hand and a small exhaust gas backpressure on the other hand, a preferred range of the cell density of the inner region is 100 to 225 cpsi (cells per square inch), and in particular preferably 150 to 200 cpsi.

According to another feature of the invention, an adjusting device selectively routes an exhaust gas flow into the inner region and/or the outer region of the carrier body. In other words, the exhaust gas aftertreatment component has, in accordance with a preferred embodiment of the invention, an adjusting device which allows a selective routing of the exhaust gas flow into the inner region and/or into the outer region. Preferably, the adjusting device is configured such that intermediate positions are also possible, so that a predeterminable portion of the exhaust gas flow is guided into the inner region and the remaining portion into the outer region.

In a particular embodiment of the invention it is provided that the adjusting device is provided only on the input side of the main line and, in its dosed position, doses off the main line and, in an open position, opens the main line. The implementation of such a configuration in terms of the manufacturing technique is particularly simple and can be implemented in a particularly beneficial manner in combination with the concentric embodiment of the parallel exhaust gas lines.

Another aspect of the present invention relates to an exhaust gas system for an internal combustion engine, in particular an Otto cycle engine, that has an exhaust gas aftertreatment component according to the present invention.

With the objects of the invention in view there is thus also provided, an exhaust gas system for an internal combustion engine, the exhaust gas system including an exhaust gas aftertreatment component having a ceramic carrier body with a plurality of axial flow channels, the carrier body having an inner region and an outer region, the outer region radially surrounding the inner region: the carrier body having a cell density in the inner region and having a cell density in the outer region, the cell density in the inner region of the carrier body being smaller than the cell density in the outer region of the carrier body; and at least the outer region of the carrier body having a coating, the coating of the outer region having an HO adsorber function for a reversible adsorption of unburnt hydrocarbons.

According to an advantageous embodiment of the invention, the exhaust gas system further includes a main catalytic converter connected downstream of the exhaust gas aftertreatment component according to the invention, the main catalytic converter preferably being configured as a three-way catalytic converter. According to a preferred development, the exhaust gas aftertreatment component according to the invention with the HC adsorber function is disposed, together with the downstream-connected main catalytic converter, in a common catalytic converter housing. In this way, existing installation space is used optimally and the manufacturing of the exhaust gas system is simplified.

According to a further configuration, the exhaust gas system further includes a precatalytic converter connected in the exhaust gas flow direction upstream of the exhaust gas aftertreatment component, the precatalytic converter preferably also being embodied as a three-way catalytic converter. The precatalytic converter has a comparatively smaller catalytic converter volume and is disposed as dose as possible to the engine, so that the precatalytic converter heats up quickly after an engine cold start.

In particular for the same type of catalytic converters it can advantageously be provided that a sum of the conversion capacities of the main catalytic converter and the catalytic coating of the inner region as well as an optionally present precatalytic converter is set up so that the total conversion capacity accomplishes a predetermined total conversion performance, in particular in a defined, standardized driving cycle, preferably in the entire engine characteristic map, i.e. which covers all operating points. In other words, the total conversion performance is distributed among the existing catalytic converters (main catalytic converter, inner region catalytic converter and/or precatalytic converter). This has the advantage that the volume and/or the noble metal loading for example of the main catalytic converter when compared to the prior art, in which no inner region catalytic converter is provided, can be chosen to be smaller. Due to the smaller volume, the available installation space can be used in a better and more flexible manner.

Another aspect of the present invention relates to a vehicle with an internal combustion engine, in particular with an Otto cycle engine, and an exhaust gas system connected thereto, which includes an exhaust gas aftertreatment component according to the invention.

With the objects of the invention in view there is therefore also provided, a vehicle including an internal combustion engine and an exhaust gas system connected to the internal combustion engine, the exhaust gas system including an exhaust gas aftertreatment component; the exhaust gas aftertreatment component including a ceramic carrier body with a plurality of axial flow channels, the carrier body having an inner region and an outer region, the outer region radially surrounding the inner region; the carrier body having a cell density in the inner region and having a cell density in the outer region, the cell density in the inner region of the carrier body being smaller than the cell density in the outer region of the carrier body; and at least the outer region of the carrier body having a coating, the coating of the outer region having an HC adsorber function for a reversible adsorption of unburnt hydrocarbons.

Further preferred embodiments of the invention result from further features specified in the dependent claims.

The invention is described in exemplary embodiments with reference to the accompanying drawings.

Although the invention is illustrated and described herein as embodied in an exhaust gas aftertreatment component with an HC adsorber function, an exhaust gas system including such an exhaust gas aftertreatment component, and a vehicle having such an exhaust gas system, it is nevertheless not intended to be limited to the details shown, since various modifications and structural changes may be made therein without departing from the spirit of he invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
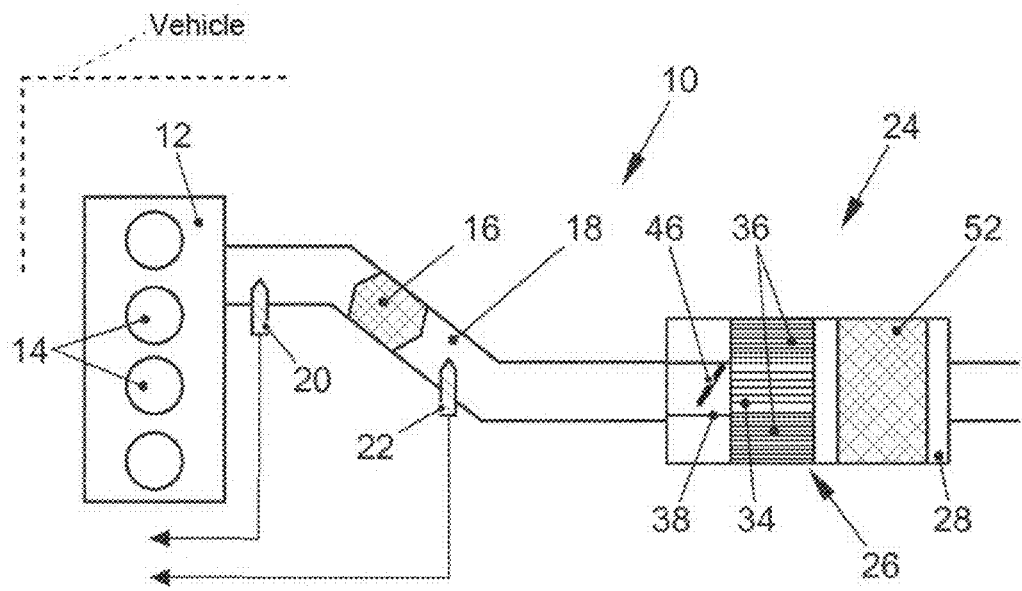
FIG. 1 is a schematic view of an exhaust gas system according to the present invention.

Referring now to the figures of the drawings in detail and first, particularly, to FIG. 1 thereof, there is shown an overall view of an exhaust gas system 10 according to the invention of a vehicle. The vehicle is only schematically indicated by a dashed line.

The exhaust gas of an internal combustion engine 12, such as an Otto cycle engine, exits through exhaust gas outlets of its cylinders 14 first into an exhaust gas manifold. At a position close to the engine, in particular directly adjacent to the exhaust gas manifold, a small-volume precatalytic converter 16 can be disposed, that performs the function of a primary catalytic converter by getting warm very quickly after a cold start of the internal combustion engine and taking over the main conversion performance after its light-off after an engine start until there is a light-off of a converter that is connected downstream. Depending on the type of the internal combustion engine, the precatalytic converter can be an oxidation catalytic converter or a three-way catalytic converter. The precatalytic converter 16 is connected to an exhaust gas pipe 18 via, for example, a flange connection.

In a position close to the engine, upstream of the precatalytic converter 16, a first lambda sensor 20 is disposed, which measures an oxygen content of the raw exhaust gas of the engine and serves in a known manner for controlling the air-fuel mixture of the engine. Further, a second lambda sensor 22 can be provided downstream of the precatalytic converter 16. The second lambda sensor 22 can perform different functions. For example, it can serve for the diagnosis of the precatalytic converter 16, the calibration of the sensors with respect to one another and/or the mixture control.

A catalytic converter unit 24 is also installed in the exhaust gas pipe 18, wherein the catalytic converter unit 24 includes an exhaust gas aftertreatment component 26 according to the invention 26 and will be explained in detail with reference to FIGS. 2 to 4.

Figure 2:
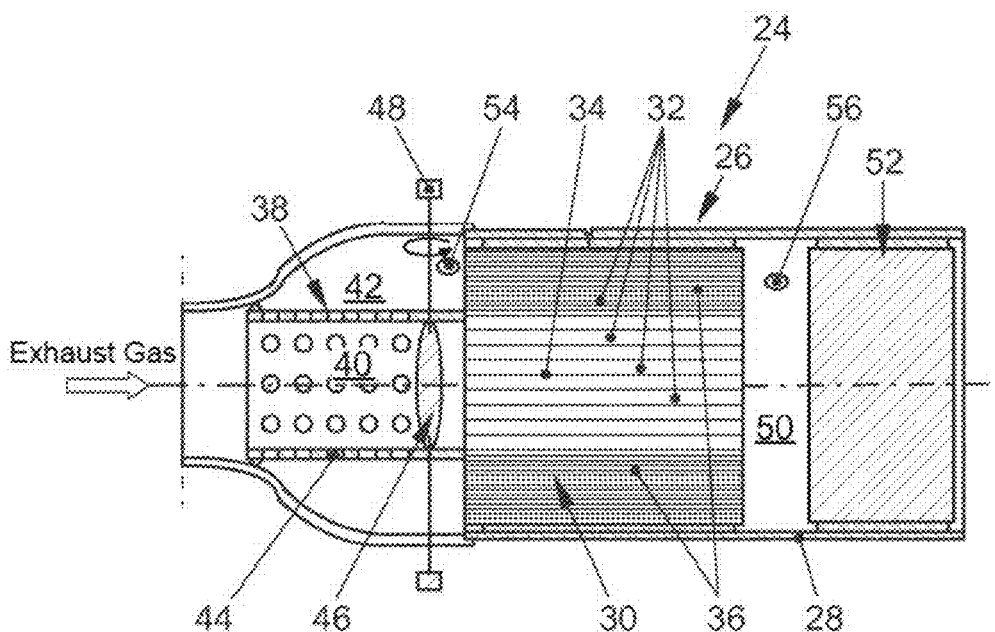
FIG. 2 is a diagrammatic longitudinal sectional view of an inventive exhaust gas aftertreatment component of the exhaust gas system of FIG. 1 according to a first embodiment of the invention.
Figure 3:
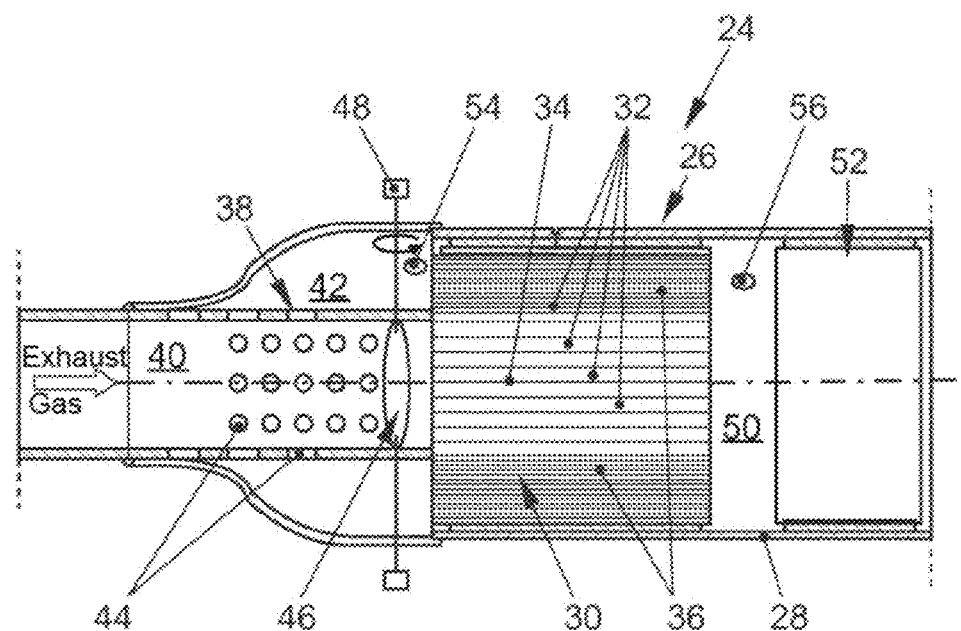
FIG. 3 is a diagrammatic longitudinal sectional view of an inventive exhaust gas aftertreatment component of the exhaust gas system of FIG. 1 according to a second embodiment of the invention.
Figure 4:
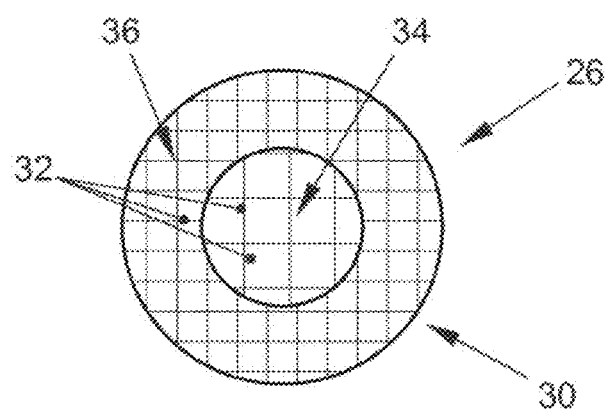
FIG. 4 is a diagrammatic cross-sectional view of an exhaust gas aftertreatment component according to FIG. 2 or FIG. 3.

As can be seen in FIGS. 2 and 3, the catalytic converter unit 24 has in the present example a common catalytic converter housing 28, in which the exhaust gas aftertreatment component 26 is mounted in a shock-absorbing manner, for example in a so-called expanding mat, specifically an intumescent mat.

The exhaust gas aftertreatment component 26 has a carrier body 30, which is manufactured in one piece from a ceramic material and has in longitudinal direction (see exhaust gas arrow) a plurality of flow channels 32, which are formed between thin ceramic walls. The known ceramic materials that are common for exhaust gas components are suitable. The carrier body 30 has an inner region 34 as well as an outer region 36 surrounding the inner region 34 along its radial periphery (perimeter). The inner region and the outer region differ in their cell density wherein that of the outer region 36 is larger than that of the inner region 34, preferably by a factor of four, Preferably, the (lower) cell density of the inner region is in the range of 100 to 225 cpsi (cells per square inch), so that in this case a cell density for the outer region of 400 to 900 cpsi results, As is in particular apparent from the cross-sectional view of the exhaust gas aftertreatment component 26 in FIG. 4, the inner region 34 and the outer region 36 may have an essentially round or ring-shaped cross-sectional shape, although other shapes, such as elliptical shapes are possible. In fact, due to factors related to production there will often not be a smooth, but a step-shaped boundary surface running between the inner region and the outer region, wherein the boundary surface follows the dimensions of the flow channels 32. Furthermore, the inner region 34 can be disposed centrally (coaxial) or in a decentralized manner with respect to the outer region 36.

At least the flow channels 32, that is their cell walls, of the outer region 36 have a coating with an HC adsorber function. This is typically a zeolite coating, which is capable of binding unburnt hydrocarbons HC by adsorption and/or by chemisorption and desorbs them again at increased temperatures. Such coatings are applied in a known manner as a suspension (washcoat) of fine ceramic particles, such as aluminum oxide. Suitable HC adsorbers are known to a person of skill in the art and require no further explanation.

Furthermore, in accordance with a particularly preferred embodiment, the outer region 36 is provided with a particulate filter function 36. This filter function is preferably achieved by flow channels 32 which are alternately closed in the flow direction. In this case, the term alternately means that a part of the flow channels 32 are closed on the inlet side and the other part, namely the channels 32 that are adjacent to the flow channels 32 that are closed on the inlet side, are closed on the outlet side. In this way, the exhaust gas entering into the flow channel that is closed on the outlet side is forced to pass through the cell walls, in order to get into an adjacent flow channel 32 that is dosed on the inlet side. When penetrating the cell wall, particles are held back. The structure of these wall filters is in principle known.

The inner region 34 also has a coating, such as a zeolite coating, which is furthermore equipped with an exhaust gas aftertreatment functionality, in particular with a catalytic function, in the present example with the function of a three-way catalytic converter.

For this purpose, suitable catalytically active noble metal particles adhere in and/or on the zeolite coating in a very fine dispersion.

The inner region 34 may in principle however also be formed without a coating, so that the inner region itself has no exhaust gas aftertreatment functionality. In this case, the inner region 34 only serves the purpose of facilitating a bypass line for bypassing the HC adsorber of the outer region 36 and of stabilizing the carrier body 30.

As can be seen in FIG. 2, a concentric inner pipe 38 is disposed in an input-side section of the catalytic converter housing 28, so that the exhaust gas path splits in this section into two parallel exhaust gas lines, namely, an inner main line 40, and a ring-shaped side line 42 enclosing the main line 40. With its downstream end, the inner pipe 38 adjoins the carrier body 30 of the exhaust gas aftertreatment component 26 according to the invention, in particular such that the main line 40 joins up to the inner region 34 and the side line to the outer region 36. The inner pipe 38 has a plurality of passage openings 44, which allow the exhaust gas to flow therethrough.

The catalytic converter unit 24 further includes an adjusting device 46 for selectively diverting the exhaust gas flow into the main line 40 and/or the side line 42. The adjusting device 46 is in the present example embodied as a flap which is pivotably mounted on a shaft, wherein the flap is disposed in the inner pipe 38 and can be moved between an open position and a closed position by a suitable actuator 48. In the closed position, the flap closes the access into the inner region 34 of the exhaust gas aftertreatment component 26 so that the exhaust gas flow flows through the openings 44 of the inner pipe 38 into the side line 42 and is thus guided into the outer region 36 and across the HC adsorber. In the open position, in contrast, both the main line 40 and the side line 42 are open. Due to the lower flow resistance in the inner region 34 of the component 26, at least the main portion of the exhaust gas flow flows through the inner region 34 and through the exhaust gas catalytic converter provided there. Preferably, the adjusting device 46 is furthermore controllable to be in intermediate positions, so that the exhaust gas flow can be guided proportionately into the main line 40 and the side line 42. Of course, the device for selectively directing the exhaust gas into the regions 34 and 36 of the component 26 can also be configured in a manner that is different from the device shown here by way of example.

Downstream of the exhaust gas aftertreatment component 26, the exhaust gas flows into a common exhaust gas line 50, where a main catalytic converter 52 is disposed, which has in particular a three-way catalytic coating and thus serves for the conversion of unburnt hydrocarbons HC, carbon monoxide CO and nitrogen oxides $NO_X$.

For controlling the adjusting device 46 and thus for guiding the exhaust gas flow across the HC adsorber of the outer region 36 and/or across the exhaust gas catalytic converter of the inner region 34, temperature sensors 54, 56 can be disposed at the positions designated by reference numerals 54 and 56 in FIG. 2, that is upstream and downstream of the exhaust gas aftertreatment component 26. The sensors 54, 56 measure the exhaust gas temperature and therefore allow drawing conclusions about the temperatures of the HC adsorber in the outer region 36 or, respectively, of the main catalytic converter 52. It is also conceivable to install the temperature sensors directly in the respective components.

The embodiment of the catalytic converter unit 24 shown in FIG. 3 differs from that according to FIG. 2 only by a longer configuration of the inner pipe 38, which in this case projects axially beyond the inlet nozzle of the housing 28. The inner pipe 38 can be connected, for example by a weldseam with the front edge of the inlet nozzle. The embodiment illustrated here has advantages mainly related to the manufacturing technique when compared to that of FIG. 2.

The exhaust gas system 10 shown in FIGS. 1 to 3 exhibits the following function.

After a cold start of the internal combustion engine 12, when the catalytic converters 16 and 52 and, if applicable, the catalytic converter provided in the inner region 34 of the component 26 do not yet have their operating temperature, the adjusting device 46 in front of the inner region 34 of the component 26 is initially dosed, so that the entire exhaust gas flow flows through the HC adsorber of the outer region 36. It stores the hydrocarbons contained in the exhaust gas, that pass the precatalytic converter 16, which is not ready for operation, unconverted in the first few seconds after the engine start. The size of the adsorber is dimensioned in a manner so that the hydrocarbons can be completely stored so long until the precatalytic converter 16 has reached its light-off temperature and takes over their conversion.

When the precatalytic converter 16 has reached this temperature, which can be identified by a modeling or by the temperature sensor 54, the adjusting device 46 is opened so that the hot exhaust gas flows across the exhaust gas catalytic converter provided in the inner region 34 of the exhaust gas aftertreatment component 26 and heats it. As soon as the exhaust gas catalytic converter of the inner region 34 reaches its light-off temperature, its further warming is accelerated due to the exothermic property of the conversion reactions. The exhaust gas that has thus already been heated furthermore flows into the main catalytic converter 52 and leads to its heating.

If, through the use of the temperature sensor 56, it is detected that also the main catalytic converter 52 has reached its light-off temperature, the adjusting device 46 is again partially or completely closed, so that the entire or, respectively, a given portion of the exhaust gas flow is guided across the HC adsorber and heats it up. Once the HO adsorber has reached its desorption temperature, the stored hydrocarbons are set free and flow into the common exhaust gas line 50 and into the main catalytic converter 52, where they are converted to $CO_2$ and $H_2O$.

Altogether, the heating of the downstream-connected main catalytic converter 52 and its light-off after a cold start are significantly accelerated by the placement of the exhaust gas catalytic converter in the inner region 34.

The volumes and/or the noble metal loadings of the exhaust gas catalytic converter of the inner region 34 and of the main catalytic converter 52, and—if provided—of the precatalytic converter 16 are configured such that the sum of their conversion performances in the entire operating characteristic map of the engine achieves a predetermined, sufficient and high total conversion performance. This means that even in corresponding high speed phases of the driving cycle, the limited exhaust gas components must be converted at least according to the specifications. The main catalytic converter 52 must furthermore be capable of converting the desorbed hydrocarbons in the desorption phase of the HC adsorber. In contrast to an analog system, in which no exhaust gas catalytic converter is provided in the inner region 34, this allows the main catalytic converter 52 to be dimensioned smaller, because the exhaust gas catalytic converter in the inner region 34 provides an additional surface area having a catalytic activity. In an extreme case, if the precatalytic converter 16 and the inner region catalytic converter 34 together provide a sufficient conversion performance in the driving cycle, the main catalytic converter 52 may be dimensioned so that it only converts the hydrocarbons released in the desorption phase. In this case, even a pure oxidation function of the main catalytic converter 52 may be sufficient.

LIST OF REFERENCE CHARACTERS 10 exhaust gas system
12 internal combustion engine
14 cylinder
16 precatalytic converter
18 exhaust gas pipe
20 first lambda sensor
22 second lambda sensor
24 catalytic converter unit
26 exhaust gas aftertreatment component
28 catalytic converter housing
30 carrier body
32 flow channels
34 inner region
36 outer region
38 inner pipe
40 main line
42 side line
44 openings
46 adjusting device
48 actuator
50 common exhaust gas line
52 main catalytic converter
54 temperature sensor
56 temperature sensor

What is claimed is:

1. An exhaust gas aftertreatment component comprising:
   a ceramic carrier body with a plurality of axial flow channels, said carrier body being a one-piece carrier body, said carrier body having an inner region and an outer region, said outer region radially surrounding said inner region;
   said carrier body having a cell density in said inner region and having a cell density in said outer region, said cell density in said inner region of said carrier body being smaller than said cell density in said outer region of said carrier body, wherein a ratio of said cell density in said outer region to said cell density in said inner region is an integer selected from the group consisting of 6, 8, 9, and 12;
   at least said outer region of said carrier body having a coating, said coating of said outer region having an HC adsorber function for a reversible adsorption of unburnt hydrocarbons; and
   said outer region being configured as a wall-flow filter such that said outer region further has a particulate filter function.

2. The exhaust gas aftertreatment component according to claim 1, wherein said inner region has no coating.

3. The exhaust gas aftertreatment component according to claim 1, wherein said inner region has a coating with a catalytic function.

4. The exhaust gas aftertreatment component according to claim 1, wherein said inner region has a coating with a three-way catalytic function.

5. The exhaust gas aftertreatment component according to claim 1, wherein said cell density in said inner region is in a range from 100 to 225 cells per square inch.

6. The exhaust gas aftertreatment component according to claim 1, wherein said cell density in said inner region is in a range from 150 to 200 cells per square inch.

7. The exhaust gas aftertreatment component according to claim 1, further including an adjusting device, said adjusting device selectively routing an exhaust gas flow into at least one of said inner region and said outer region of said carrier body, said adjusting device including an adjustable flap and an inner pipe, said adjustable flap being disposed in said inner pipe, said inner pipe having a downstream end, said downstream end of said inner pipe adjoining said carrier body, and said inner pipe being formed with a plurality of passage openings.

8. An exhaust gas system for an internal combustion engine, the exhaust gas system comprising:
   an exhaust gas aftertreatment component including a ceramic carrier body with a plurality of axial flow channels, said carrier body being a one-piece carrier body, said carrier body having an inner region and an outer region, said outer region radially surrounding said inner region;
   said carrier body having a cell density in said inner region and having a cell density in
   said outer region, said cell density in said inner region of said carrier body being smaller than said cell density in said outer region of said carrier body, wherein a ratio of said cell density in said outer region to said cell density in said inner region is an integer selected from the group consisting of 6, 8, 9, and 12;
   at least said outer region of said carrier body having a coating, said coating of said outer region having an HC adsorber function for a reversible adsorption of unburnt hydrocarbons; and
   said outer region being configured as a wall-flow filter such that said outer region further has a particulate filter function.

9. The exhaust gas system according to claim 8, further including a precatalytic converter connected in an exhaust gas flow direction upstream of said exhaust gas aftertreatment component.

10. The exhaust gas system according to claim 9, wherein said precatalytic converter is a three-way catalytic converter.

11. The exhaust gas system according to claim 8, further including a main catalytic converter connected in an exhaust gas flow direction downstream of said exhaust gas aftertreatment component.

12. The exhaust gas system according to claim 11, wherein said main catalytic converter is a three-way catalytic converter.

13. A vehicle comprising:
    an internal combustion engine;
    an exhaust gas system connected to said internal combustion engine, said exhaust gas system including an exhaust gas aftertreatment component;
    said exhaust gas aftertreatment component including a ceramic carrier body with a plurality of axial flow channels, said carrier body being a one-piece carrier body, said carrier body having an inner region and an outer region, said outer region radially surrounding said inner region;
    said carrier body having a cell density in said inner region and having a cell density in said outer region, said cell density in said inner region of said carrier body being smaller than said cell density in said outer region of said carrier body, wherein a ratio of said cell density in said outer region to said cell density in said inner region is an integer selected from the group consisting of 6, 8, 9, and 12;

at least said outer region of said carrier body having a coating, said coating of said outer region having an HC adsorber function for a reversible adsorption of unburnt hydrocarbons; and said outer region being configured as a wall-flow filter such that said outer region further has a particulate filter function.

* * * * *